Patented Dec. 8, 1953

2,662,085

UNITED STATES PATENT OFFICE 2,662,085

PROCESS FOR PREPARATION OF CHLORINATED COPPER PHTHALOCYANINE

Harris Holtzman and Eric Simon, New York, N. Y., assignors to Ansbacher-Siegle Corporation, New York, N. Y., a corporation of New York No Drawing. Application June 29, 1950,
Serial No. 171,228

11 Claims. (Cl. 260—314.5)

The present invention relates to an improved and novel process for the manufacture of halogenated phthalocyanine coloring matters. More particularly it relates to a process of manufacture of chlorinated copper phthalocyanines.

The chlorinated phthalocyanines generally make excellent green pigments possessing bright shade, high tinctorial strength, good opacity and outstanding resistance to exposure to light, heat, dilute acid, weak and strong alkalies and the organic solvents most commonly used in pigment application. Chlorinated copper phthalocyanine, particularly, has found extensive application for coloring paints, printing inks, plastics, floor covering compositions, paper and the like.

The phthalocyanines have been characterized (see R. P. Linstead and others, Journal of the Chemical Society (London) 1934, (1016–1039)) as resonating heterocyclic structures in which four aromatic rings are combined by extracyclic nitrogen atoms, the whole forming a very stable coordination complex with various metals, such as copper, iron, nickel, etc. The chlorinated copper phthalocyanines can be represented by the formula

[(C$_6$H$_{4-n}$Cl$_n$) C$_2$N$_2$]$_4$Cu where $n$ represents the number of chlorine atoms substituted in each benzene ring. Introduction of chlorine atoms into the phthalocyanine molecule leads to progressively greener shades with increased chlorine content. For instance, the commercially used copper phthalocyanine blue is converted finally into a yellowish green pigment by substitution of most or all of the aromatic hydrogens by chlorine atoms. The theoretical limit of such substitution is reached when 16 aromatic hydrogen atoms have been replaced by chlorine atoms and it has previously been thought that the practical limit is reached when 13 aromatic atoms have been so replaced.

Furthermore, it has been demonstrated that, in order to obtain desirable green shades, it is necessary to achieve a high degree of chlorination of the molecule with introduction of at least 13 atoms of chlorine per phthalocyanine molecule. In the prior procedure for the direct chlorination of phthalocyanine, the most highly chlorinated phthalocyanines obtained rarely attain to 12 to 13 atoms of chlorine to the molecule, and to achieve this result drastic conditions involving not only high temperatures and high pressures but also excess of chlorine are required.

The chlorinated copper phthalocyanines have heretofore been made by a number of different processes, practically all of which are cumbersome and costly, generally requiring extensive purification procedures to obtain a satisfactory product. These prior processes have been carried out at high temperatures of the order of from 150° C. to 300° C. and sometimes under pressure. In order to attain these high temperatures, the use of fused solids or liquids under high pressures have been resorted to. When such temperatures are used, numerous by-products are formed which lower the yield and require expensive purification procedures.

Indeed, processes have been described for direct chlorination in the presence of various reaction media which are liquid at the high reaction temperatures and pressures employed and the product is subsequently separated from the reaction medium and purified. Examples of such media suggested for this purpose are: Sulfuryl chloride, thionyl chloride, sulphur dichloride, nitrobenzene, phthalic anhydride, aluminum chloride, sodium chloride and others. It has also been suggested to use tetrachloro-phthalic anhydride as starting material, condensing this with nitrogen derivatives such as urea in inert high boiling organic solvents in the presence of metal salts and catalysts. But in this process, as in the others referred to, there occurs considerable formation of by-products which lower the yield and require expensive purification procedures.

We have, however, now found that a high degree of chlorination of phthalocyanines can be effected smoothly by direct addition of chlorine to a homogeneous solution of phthalocyanine in chlorsulfonic acid in the presence of various chlorination catalysts. In the process of the invention, copper phthalocyanine is readily dissolved in chlorsulfonic acid. This enable us to use lower temperatures, thus reducing the possibility of side reactions including the partial destruction of the phthalocyanine molecule. Thus, the reaction may be conducted at a range of temperatures between 25° C. and 110° C. Preferably, chlorine is bubbled through at room temperature and the chlorination takes place mainly at temperatures below 100° C. although the temperature may be raised gradually to complete the reaction, say to about 115° C. for a short time.

The green chlorinated product is isolated by drowning the acid solution into water kept at low temperature. The pigment is then filtered, washed free of acid and dried, the resulting compound containing from 12 to 15 atoms of chlorine per molecule.

The catalysts employed are not relied upon as a source of chlorine for the chlorination of the phthalocyanine molecules for they may be recovered at the end of the process in either the same condition in which they were originally added or in a chlorinated stage. In fact, some suitable catalysts are chlorine free. We may group some suitable catalysts as follows:

*Group I.*—Chlorine free catalysts: Sulphur, iodine and bromine.

*Group II.*—Non-metallic chlorides: Sulphur mono-chlorides, sulphur dichloride and iodine chlorides.

*Group III.*—Metallic chlorides: Ferric chloride, aluminum chloride, antimony chloride and cupric chloride.

We may add to this list any other chlorination catalyst.

The process is carried out preferably at atmospheric pressure although elevated pressures may also be used.

It is, indeed, surprising that a highly chlorinated phthalocyanine may be obtained in good yield and high purity by chlorinating in chlorsulfonic acid solution in the presence of suitable catalysts, particularly in view of the fact that the use of other acid solvents for chlorination, such as concentrated sulfuric acid, sulfuric acid monohydrate and oleum, as well as mixtures of these with chlorsulfonic acid, produce more or less complete decomposition of phthalocyanine.

The exact mechanism of the reaction is unknown to us and we do not here intend to give a full and exact explanation thereof. Nevertheless it is our belief that the chlorination is mainly effected by the free chlorine bubbled through the solution at temperatures well below 100° C. It is also our belief that the chlorsulfonic acid takes an active part in the reaction whereby the benzene hydrogens in the phthalocyanine molecule are replaced by chlorine. It is also a fact that the final reaction product does not contain sulfonated phthalocyanine products. The catalysts, however, while they act in effecting a rapid and smooth absorption of chlorine by the phthalocyanine molecule, do not act as supplier of chlorine thereto as they are found at the completion of the reaction in the same condition as on addition. It has also been found that the use of sulfur containing catalysts particularly aids in the process and produces smoother reaction.

It is further particularly advantageous that chlorsulfonic acid may be employed for direct chlorination, due to the fact that phthalocyanines are very readily soluble in chlorsulfonic acid and provides the advantages that a homogeneous solution offers in the furtherance and control of chemical reactions in contrast to previous processes.

A further striking advantage in the use of chlorsulfonic acid as a solvent lies in the fact that the product can be isolated by discharging the chlorsulfonic acid solution of the chlorinated phthalocyanine directly into water wherein it precipitates in its final commercial form. This avoids the necessity for separation and purification from the reaction medium as well as for the purification and isolation of the reaction medium itself which would be normally practiced for economical operation. It also eliminates a purification of the final product.

It is an object of the invention to provide a process for chlorinating phthalocyanine of high chlorine content which can be carried out at low temperatures.

It is a further object to provide a process by which a phthalocyanine and particularly a copper phthalocyanine can be chlorinated, yielding a product in which 12 to 15 aromatic hydrogen atoms have been replaced by chlorine atoms.

It is a still further object to provide a process for producing a highly chlorinated phthalocyanine that yields a final product substantially free from by-products and decomposition products and that can be recovered in final commercial form by simple precipitation in water.

Our invention is illustrated but not limited by the following examples which indicate several preferred modes of operation. Clorinated copper phthalocyanine, which is the preferred industrial product, has been selected for these examples. The parts are given by weight.

*Example I*

3.0 parts by weight of copper phthalocyanine are charged with agitation into 41 parts by weight of chlorsulfonic acid; 5 parts by weight sulfur monochloride and 0.3 part by weight iodine monochloride are added. Chlorine gas is bubbled through this solution at 30° C. When the olive color of the original solution has changed to carmine red, the reaction mass is heated slowly to 90° C. The chlorine addition is stopped when the desired degree of chlorination is obtained, as evidenced by drowning small batch samples into water on a porcelain plate, and observing the degree of greenness of shade of the isolated product. Heating is continued for an hour, and the reaction mass is run slowly into 410 parts by weight of cold water, at room temperature wherein the clean green halogenated phthalocyanine pigment precipitates. After filtration, water washing and drying, the product contains 48.2% chlorine which corresponds to 14.6 chlorine atoms per copper phthalocyanine molecule. The yield is 5.7 parts, representing a theoretical yield of 98%.

*Example II*

3 parts of the copper phthalocyanine are charged to 41 parts chlorsulfonic acid, 2.5 parts by weight sulfur dichloride, 0.6 part iodine monochloride. Chlorine gas is passed through the solution at 67° C. for two hours, and the temperature is then gradually raised until in four hours it reaches 115° C., where it is maintained for one-half hour. The reaction mass is cooled to 60° C. and drowned into 410 parts by weight of water. The filtered, washed and dried product contained 47.0% chlorine. Yield: 5.3 parts, representing a theoretical yield of 92.5%.

*Example III*

3 parts by weight of copper phthalocyanine are charged into 41 parts by weight chlorsulfonic acid, 1.5 parts by weight sulfur dichloride, 0.15 part by weight antimony trichloride. Chlorine gas is passed into the reaction mixture at 30° C. for two hours, and then the temperature is gradually raised over four hours to 110° C. The reaction mass is cooled to 60° C., and drowned into 410 parts by weight of water. The filtered, washed and dried product weighs 5.4 parts containing 45.6% chlorine and representing a yield of 95% of theory.

In the prior processes, phthalocyanine compounds are obtained in "crude" form and to obtain maximum tinctorial strength and cleanliness, they require a conditioning process whereby the pigment particles are rendered fit for pigment use. Such conditioning is most generally accomplished by acid pasting whereby the crude compound is dissolved in concentrated sulphuric acid and drowned into water under proper conditions of dilution, temperature, rate of drowning and other conditions commonly practiced in the art.

It is one of the additional advantages of the present invention that the acid pasting step is not necessary and that the chlorination reaction mixture, consisting of a chlorsulfonic acid solution of the green pigment, drowned directly into water, yields the pigment in a suitable commercial form.

The examples given above, it will be understood, are merely illustrative. The details of procedure may be varied within wide limits of temperature within the ranges given, the amounts and types of catalysts. Conditions at drowning the reaction mixture and the use of surface active agents may also vary widely according to practices well known in the art.

While these examples refer to the very yellowish green pigment obtained by introducing a large number of chlorine atoms, the chlorination may be stopped at any desired degree, so as to produce intermediate, more bluish shades, containing smaller numbers of chlorine atoms.

It is understood that this process is not limited to the use of halogen-free copper phthalocyanine as starting material, but may also start with partially halogenated copper phthalocyanines.

Having thus described our invention, what we claim is:

1. In a process for chlorinating copper phthalocyanine, the improvement of performing the reaction by bubbling chlorine through said copper phthalocyanine when dissolved in chlorsulphonic acid in the presence of a chlorination catalyst and maintaining the temperature of said solution during the addition of said chlorine below 115° C.

2. In a process of chlorinating copper phthalocyanine, the improvement of performing the reaction by forming, at a temperature below 110° C., a solution of copper phthalocyanine in chlorsulphonic acid, adding thereto a chlorination catalyst, passing chlorine gas through said solution while maintaining said solution at temperatures between 25° and 115° C. and then drowning the reaction mass in cold water thus precipitating a green pigment containing from 12 to 15 atoms of chlorine and no atoms of sulphur per copper phthalocyanine molecule.

3. In a process for chlorinating copper phthalocyanine, the improvement of performing the reaction, by forming at a temperature below 100° C. a solution of copper phthalocyanine in chlorsulphonic acid, heating said solution to temperatures below 100° C. and bubbling chlorine through said solution in the presence of a chlorination catalyst while keeping the temperature of said solution below 115° C.

4. In a process for chlorinating copper phthalocyanine, the improvement of performing the reaction by forming a liquid homogeneous solution of copper phthalocyanine in chlorsulphonic acid at room temperature, adding thereto a chlorination catalyst, chlorinating said copper phthalocyanine by bubbling chlorine gas through said solution while gradually raising the same to temperatures from 25° C. to 100° C. over a period of from one to four hours, then raising the temperature to 115° C. for one-half hour and finally precipitating the green pigment so formed by drowning the reaction mass in cold water.

5. In a process for chlorinating copper phthalocyanine, the improvement of performing the reaction by dissolving copper phthalocyanine in chlorsulphonic acid at room temperature, adding thereto a chlorination catalyst, then bubbling chlorine gas through the reaction mass so formed while maintaining the same at temperatures below 115° C., then cooling the reaction mass to 60° C. and drowning the same in water and finally filtering, washing and drying the chlorinated substantially sulphur-free copper phthalocyanine precipitate.

6. In a process for chlorinating copper phthalocyanine, the improvement of performing the reaction by dissolving copper phthalocyanine in chlorsulphonic acid at room temperature and adding a chlorination catalyst thereto, then bubbling chlorine gas through the reaction mass so formed while maintaining the temperature below 100° C. until the said reaction mass yields a chlorinated copper phthalocyanine precipitate in water containing 12 to 15 atoms of chlorine and no atoms of sulphur per molecule.

7. In a process for chlorinating copper phthalocyanine, the improvement of performing the reaction by chlorinating a homogeneous solution of copper phthalocyanine in chlorsulphonic acid in the presence of a chlorination catalyst at temperatures below 100° C., drowning the reaction mass in cold water and recovering the precipitate.

8. A process for manufacturing a green coloring matter which comprises charging with agitation 3 parts by weight of copper phthalocyanine into 41 parts by weight of chlorsulfonic acid and adding thereto a mixture of between 1.5 and 5 parts by weight of a sulfur chloride and up to .6 of a part by weight of a chemical substance chosen from the group comprising sulfur, iodine, antimony and their chlorides, then bubbling chlorine gas through the solution so formed while maintaining the same at 30° C. for a period of two hours; then raising the temperature over a period of four hours to between 90° C. to 115° C. and maintaining the temperature within that range for about one-half hour and then cooling the reaction mass to 60° C. then drowning the same in 410 parts of water, thus precipitating said green coloring matter comprising nonsulfonated chlorinated copper phthalocyanine containing at least 12 chlorine atoms per molecule.

9. A process for manufacturing a green coloring matter which comprises charging with agitation 3 parts by weight of copper phthalocyanine into 41 parts by weight of chlorsulfonic acid and adding thereto 5 parts by weight of sulfur monochloride and 0.3 part by weight of iodine monochloride, then bubbling chlorine gas through the solution so formed while maintaining the same at 30° C. until said solution changes to a carmine red color; then raising the temperature slowly to 90° C. until a precipitation of the desired shade of green forms in water; and finally running the reaction mass slowly into 410 parts of cold water at room temperature thus precipitating a clean green chlorinated copper phthalocyanine pigment containing from 12 to 15 chlorine atoms per molecule.

10. A process for manufacturing green coloring matter which comprises charging 3 parts by weight of copper phthalocyanine into 41 parts by weight of chlorsulfonic acid, 2.5 parts by weight of sulfur dichloride and 0.6 part by weight of iodine monochloride; then bubbling chlorine gas through the solution so formed while maintaining said solution at 67° C. for a period of two hours; then gradually raising the temperature over a period of four hours to 115° C. and maintaining that temperature for about one-half hour; and finally cooling the reaction mass to 60° C. and drowning the same in 410 parts of water, thus precipitating the green pigment and recovering the same.

11. A process for manufacturing green coloring matter which comprises charging 3 parts by weight of copper phthalocyanine into 41 parts by weight of chlorsulfonic acid, and adding 1.5 parts by weight of sulfur dichloride and 0.15 part by weight of antimony trichloride; then bubbling chlorine gas through the reaction mixture at 30° C. for two hours; then raising the temperature over a period of four hours to 110° C.; then cooling the reaction mass to 60° C. and drowning the same into 410 parts of water at room temperature and recovering the green pigment so precipitated.

HARRIS HOLTZMAN.
ERIC SIMON.

References Cited in the file of this patent

UNITED STATES PATENTS

| Number | Name | Date |
|---|---|---|
| 2,219,330 | Nadler | Oct. 29, 1940 |
| 2,377,685 | Fox | June 5, 1945 |
| 2,484,300 | Mayhew | Oct. 11, 1949 |

FOREIGN PATENTS

| Number | Country | Date |
|---|---|---|
| 514,857 | Great Britain | Nov. 20, 1939 |